(12) United States Patent
Nelson et al.

(10) Patent No.: US 11,320,368 B2
(45) Date of Patent: May 3, 2022

(54) OPTICAL ANALYSIS AND SAMPLING SYSTEMS

(71) Applicant: SABIC GLOBAL TECHNOLOGIES B.V., Bergen op Zooom (NL)

(72) Inventors: Mark Erik Nelson, Mt. Vernon, IN (US); Arkady Samuilovich Dykman, St. Petersburg (RU); Andrey Vladimirovich Zinenkov, St. Petersburg (RU)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 131 days.

(21) Appl. No.: 16/838,220

(22) Filed: Apr. 2, 2020

(65) Prior Publication Data

US 2020/0232912 A1    Jul. 23, 2020

Related U.S. Application Data

(62) Division of application No. 15/524,305, filed as application No. PCT/IB2015/059044 on Nov. 23, 2015, now Pat. No. 10,648,906.

(30) Foreign Application Priority Data

Nov. 24, 2014 (RU) ........................... RU2014147232

(51) Int. Cl.
*G01N 1/10* (2006.01)
*G01N 21/05* (2006.01)
(Continued)

(52) U.S. Cl.
CPC ............ *G01N 21/272* (2013.01); *G01N 1/10* (2013.01); *G01N 1/14* (2013.01); *G01N 1/38* (2013.01);
(Continued)

(58) Field of Classification Search
CPC .......... G01N 21/272; G01N 1/10; G01N 1/14; G01N 1/38; G01N 21/05; G01N 2021/754; G01N 2001/418; G01N 2001/1427
See application file for complete search history.

(56) References Cited

U.S. PATENT DOCUMENTS 3,516,752 A   6/1970   Hrdina
3,609,040 A   9/1971   Kuzel et al.
(Continued)

FOREIGN PATENT DOCUMENTS

CN   101004386 A   7/2007
CN   101241072 A   8/2008
(Continued)

OTHER PUBLICATIONS

European Search Report for the corresponding European Application No. EP20174442; dated Aug. 3, 2020; 13 pages.
(Continued)

*Primary Examiner* — Brian J. Sines
(74) *Attorney, Agent, or Firm* — Cantor Colburn LLP

(57) ABSTRACT

A sampling system for an optical cell containing a process fluid comprises a first bi-directional pump in fluid communication with a sampling path and a second bi-directional pump in fluid communication with the first bi-directional pump and a storage vessel. The first bi-directional pump is configured to withdraw a first sample of the process fluid and to cause the first sample to flow towards the first bi-directional pump. The second bi-directional pump is configured to withdraw a second sample from the storage vessel and to cause the second sample to move toward and mix with the first sample. A first rate of withdraw of the first sample is greater than a second rate of movement of the second sample toward the first sample, and the difference between the first rate and the second rate correspond to a
(Continued)

pre-determined ratio of the first sample mixed with the second sample.

6 Claims, 2 Drawing Sheets

(51) Int. Cl.
    *G01N 21/01*     (2006.01)
    *G01N 21/27*     (2006.01)
    *G01N 1/38*     (2006.01)
    *G01N 21/75*     (2006.01)
    *G01N 1/14*     (2006.01)
    *G01N 21/17*     (2006.01)
    *G01N 21/359*     (2014.01)

(52) U.S. Cl.
    CPC ......... *G01N 21/05* (2013.01); *G01N 21/1717* (2013.01); *G01N 21/274* (2013.01); *G01N 21/359* (2013.01); *G01N 21/75* (2013.01); *G01N 2001/1418* (2013.01); *G01N 2021/1731* (2013.01); *G01N 2021/754* (2013.01)

(56) References Cited

U.S. PATENT DOCUMENTS

| | | |
|---|---|---|
| 3,689,164 A | 9/1972 | Riley |
| 3,709,616 A | 1/1973 | Jonsson |
| 4,108,608 A | 8/1978 | Maher, Jr. et al. |
| 4,330,206 A | 5/1982 | Gausmann et al. |
| 5,116,759 A | 5/1992 | Klainer et al. |
| 5,173,743 A | 12/1992 | Kim |
| 5,270,945 A | 12/1993 | Heath et al. |
| 5,695,720 A * | 12/1997 | Wade ............ G01N 35/085 356/36 |
| 5,733,789 A | 3/1998 | Wright et al. |
| 5,847,835 A | 12/1998 | Fukunaga |
| 5,866,794 A | 2/1999 | Stock |
| 6,336,468 B1 | 1/2002 | Cords |
| 7,986,406 B2 | 7/2011 | Taylor-Hayward et al. |
| 2004/0165185 A1 | 8/2004 | Reintjes et al. |
| 2006/0104827 A1 | 5/2006 | Shaw et al. |
| 2007/0052956 A1 | 3/2007 | Blair |
| 2007/0263207 A1 | 11/2007 | Mertz et al. |
| 2008/0264140 A1 * | 10/2008 | Hill .................. G01N 33/0006 73/1.03 |
| 2009/0155916 A1 | 6/2009 | Horan et al. |
| 2009/0324448 A1 | 12/2009 | Yano et al. |
| 2010/0283995 A1 | 11/2010 | Durrer et al. |
| 2012/0028364 A1 | 2/2012 | Kraus et al. |
| 2012/0173164 A1 | 7/2012 | Steuerwald et al. |
| 2013/0075093 A1 | 3/2013 | Van Hal et al. |
| 2014/0026684 A1 | 1/2014 | Weber et al. |
| 2017/0363537 A1 | 12/2017 | Nelson et al. |

FOREIGN PATENT DOCUMENTS

| | | |
|---|---|---|
| CN | 101294906 A | 10/2008 |
| CN | 201210145 Y | 3/2009 |
| CN | 201803951 U | 4/2011 |
| CN | 203224395 U | 10/2013 |
| JP | H01113062 A | 5/1989 |
| KR | 20020091757 A | 12/2002 |
| KR | 20110115737 A | 10/2011 |
| WO | 2014097286 A1 | 6/2014 |

OTHER PUBLICATIONS

International Search Report for International Application No. PCT/IB2015/059044; International Filing Date Nov. 23, 2015; dated Jun. 1, 2016; 8 pages.

Written Opinion of the International Search Report for International Application No. PCT/IB2015/059044; International Filing Date Nov. 23, 2015; dated Jun. 1, 2016; 12 pages.

Chinese Search Report for the corresponding Chinese Application No. 2019112677491; dated Dec. 2, 2021; 4 pages.

European Office Action for the corresponding European Application No. 20174442.2; dated Feb. 8, 2022; 13 pages.

* cited by examiner

OPTICAL ANALYSIS AND SAMPLING SYSTEMS

CROSS-REFERENCE TO RELATED APPLICATIONS

This application is a Divisional application of Ser. No. 15/524,305, filed May 4, 2017, which is a National Stage of PCT/IB2015/059044, filed Nov. 23, 2015, which claims benefit of Russian Patent Application No. 2014147232 filed on Nov. 14, 2014.

BACKGROUND

When analyzing a given substance, multiple instruments are routinely used to determine the characteristics of only a single sample. However, the use of advanced calibration models often requires that several characteristics be obtained simultaneously. The conventional optical cells fall short of providing such an instrument for assessing simultaneous characteristics such as temperature, spectroscopic, and compositional data necessary to prepare calibration models.

Further, temperature gradients relating to the subject fluid can cause significant error in the resulting calibration models. Any deviation in the "measured" vs. the "real" temperature will result in additional error in the calibration model that is subsequently created. Current optical cells are not configured to manage such temperature gradients.

These and other shortcomings are addressed by the optical analysis and sampling systems of the present disclosure.

SUMMARY

As described herein, the disclosure, in one aspect, relates to an optical system. The optical system can comprise an optical cell having an interior fluid chamber defined by an interior surface of a housing, a process inlet disposed in the housing and in fluid communication with the interior fluid chamber, and a process outlet disposed in the housing and in fluid communication with the interior fluid chamber, wherein the process inlet and process outlet facilitate the flow of a fluid through the interior fluid chamber. An optical element can be configured to direct electromagnetic radiation through a portion of the fluid flowing through the interior fluid chamber. A sampling outlet can be disposed in the housing and in fluid communication with the interior fluid chamber. A first bi-directional pump can be in fluid communication with the sampling outlet and a first storage vessel. As an example, the first bi-directional pump can be configured to withdraw a first sample of the fluid flowing through the interior fluid chamber via the sampling outlet and to cause the first sample to flow into the first storage vessel.

In another aspect, a sampling system for an optical cell containing a process fluid can comprise a first bi-directional pump in fluid communication with a sampling path. As an example, the first bi-directional pump can be configured to withdraw a first sample of the process fluid and to cause the first sample to flow towards the first bi-directional pump. A second bi-directional pump can be in fluid communication with the first bi-directional pump and a storage vessel. As an example, the second bi-directional pump can be configured to withdraw a second sample from the storage vessel and to cause the second sample to move toward and mix with the first sample. As a further example, a first rate of withdrawal of the first sample can be greater than a second rate of movement of the second sample toward the first sample. As a further example, a difference between the first rate and the second rate can correspond to a pre-determined ratio of the first sample mixed with the second sample.

Additional aspects of the disclosure concern methods comprising: optically analyzing a fluid passing through an optical cell, determining a temperature of the fluid during the optical analysis, removing a first sample of the fluid from the optical cell via a first bi-directional pump, mixing a second sample with the first sample via a second bi-directional pump, and receiving the mixed first sample and second sample in a vessel.

BRIEF DESCRIPTION OF THE FIGURES

The accompanying figures, which are incorporated in and constitute a part of this specification, illustrate several aspects and together with the description serve to explain the principles of the disclosure.

Figure 1:
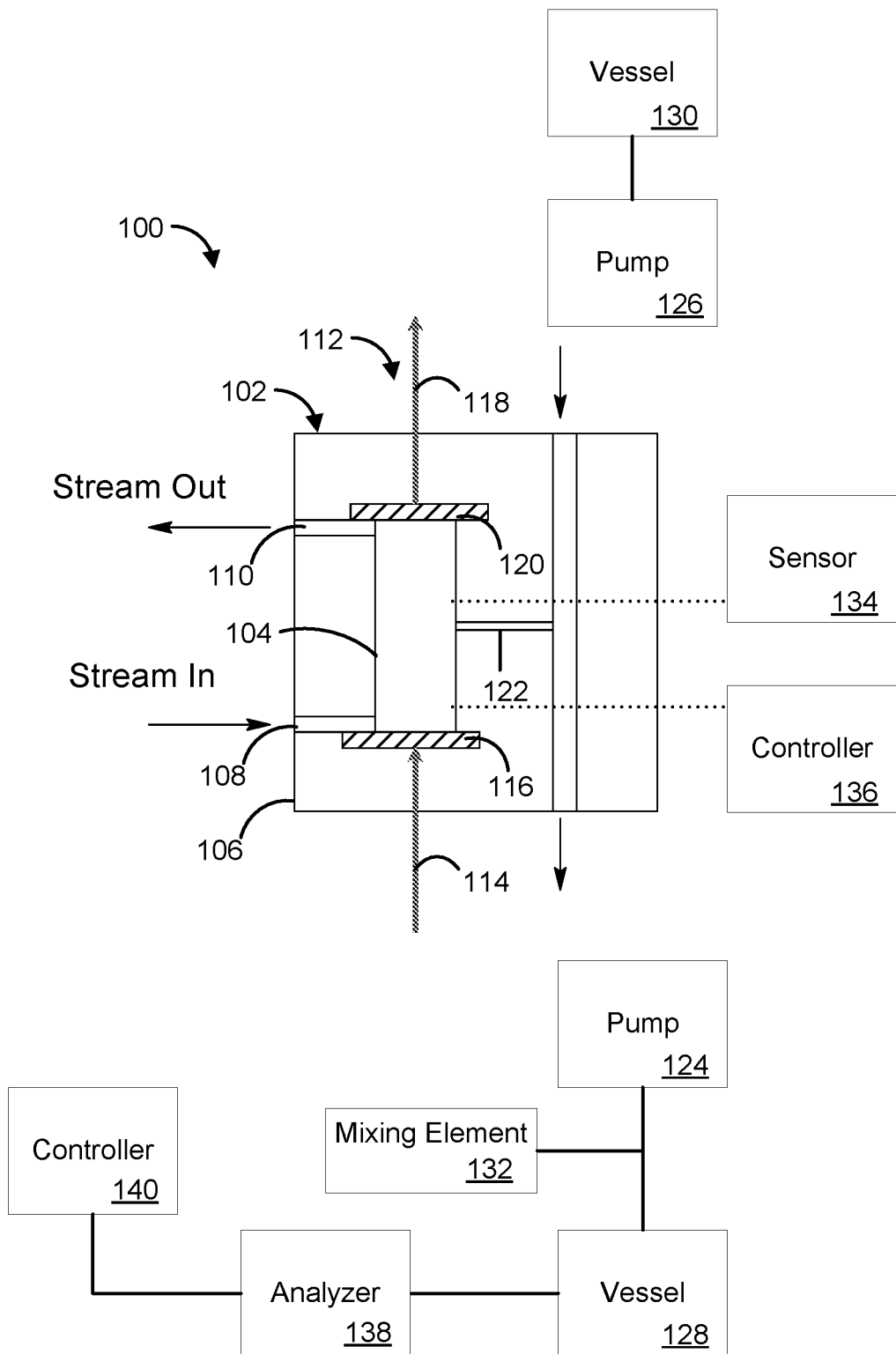
FIG. 1 shows an example optical analysis system according to an aspect of the present disclosure.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DESCRIPTION

The present disclosure can be understood more readily by reference to the following detailed description of the disclosure and the Examples included therein.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided herein can be different from the actual publication dates, which can require independent confirmation.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. As a further example, about may include +/− a tolerance such as +/−10%.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein, the terms "optional" or "optionally" means that the subsequently described event or circumstance can or cannot occur, and that the description includes instances where said event or circumstance occurs and instances where it does not.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

In an aspect, FIG. 1 depicts an example optical analysis system 100. The optical analysis system 100 can comprise an optical cell 102 having an interior fluid chamber 104. The optical cell 102 can be configured as a near infrared analysis system. However, other configurations and spectrum of analysis can be used. As an example, the optical cell 102 can comprise a housing 106 defining the interior fluid chamber 104. The interior fluid chamber 104 can have any shape and size configured for measuring various characteristics of fluids.

A process inlet 108 can be disposed (e.g., formed, positioned, integrated) in the housing 106 and in fluid communication with the interior fluid chamber 104. The process inlet 108 can be configured to receive a fluid. A process outlet 110 can be disposed in the housing 106 and in fluid communication with the interior fluid chamber 104. As an example, the process inlet 108 and the process outlet 110 can facilitate the flow of the fluid through the interior fluid chamber 104. Various fluids (e.g., gaseous, aqueous, etc.) can be caused to flow through the interior fluid chamber 104. One or more of the process inlet 108 and the process outlet 110 can be in fluid communication with an oxidation element, a concentrator, a reactor in a chemical processing plant, a vessel in a chemical processing plant, a vessel in a food processing plant, a medical sample vessel, or a combination thereof. One or more of the process inlet 108 and the process outlet 110 can be in fluid communication with a cumene oxidation unit, cumene hydroperoxide (CHP) concentration unit, CHP decomposition unit, phenol purification unit, acetone purification unit, alpha-methylstyrene (AMS) recovery stage, purification stage, hydrogenation unit, p-cumyl phenol production stage, or p-cumyl purification unit, or a combination thereof.

One or more optical elements 112 can be configured to direct electromagnetic radiation through a portion of the fluid flowing through the interior fluid chamber 104. In an aspect, the optical elements 112 comprise fiber optics, one or more collimators, or a combination thereof. As an example, a source optical fiber 114 coupled to a source collimator 116 for directing electromagnetic radiation through the interior fluid chamber 104. A return optical fiber 118 can be coupled to a return collimator 120 configured to receive electromagnetic radiation passing through at least a portion of the fluid in the interior fluid chamber 104. In an aspect, the electromagnetic radiation directed through a portion of the fluid flowing through the interior fluid chamber 104 has an optical path length between about 0.1 millimeter (mm) and about 20 mm. In another aspect, the electromagnetic radiation directed through a portion of the fluid flowing through the interior fluid chamber 104 has an optical path length between about 0.5 mm and about 100 mm Other optical path lengths can be used based upon the material being analyzed.

In an aspect, a sampling outlet 122 can be disposed in fluid communication with the interior fluid chamber 104. As an example, the sampling outlet 122 can be disposed in the housing 106. The sampling outlet 122 can be configured to receive at least a portion of the fluid from the interior fluid chamber 104. As a further example, one or more pumps 124, 126 can be configured to cause the at least a portion of the fluid in the interior fluid chamber 104 to flow through the sampling outlet 122 (e.g., to take a sample of the fluid).

In an aspect, a first bi-directional pump 124 can be in fluid communication with the sampling outlet 122. The first bi-directional pump 124 can be configured to withdraw a first sample of the fluid flowing through the interior fluid chamber 104 via the sampling outlet 122. The first bi-directional pump 124 can be or comprise one or more a volumetric pump, a syringe pump, or a combination thereof. In another aspect, the first bi-directional pump 124 can be in fluid communication with a first storage vessel 128. As an example, the first bi-directional pump 124 can be configured to cause the first sample to flow into the first storage vessel 128. In certain embodiments, the first storage vessel 128 is comprised as a volumetric portion of the first bi-directional pump. In another aspect, a valve can be disposed in fluid communication with the first bi-directional pump 124 to control the ingress and egress of fluid relative to the first bi-directional pump 124.

In an aspect, a second bi-directional pump 126 can be in fluid communication with the first bi-directional pump 124 and a second storage vessel 130. The second bi-directional pump 126 can be or comprise one or more a volumetric pump, a syringe pump, or a combination thereof. The second bi-directional pump 126 can be configured to withdraw a second sample from the second storage vessel 130 and to cause the second sample to mix with the first sample withdrawn from the interior fluid chamber 104. As an example, the second sample can comprise comprises a quencher, a diluent, or a combination thereof, which can be withdrawn from the second storage vessel 130.

In another aspect, a mixing element 132 can be disposed between the second bi-directional pump 126 and the first bi-directional pump 124. The mixing element 132 can be configured to receive the first sample and the second sample and to mix the first sample with the second sample. Various mixers can be used.

In another aspect, the optical analysis system 100 can comprise one or more temperature elements 134, 136. As an example, a temperature sensor 134 can be configured to measure a temperature within the interior fluid chamber 104. As a further example, a temperature controller 136 (e.g., heater, cooler, thermal exchanger) can be configured to control a temperature of the optical cell. Using one or more of the temperature elements 134, 136, the temperature of the optical cell 102 can be controlled to a predetermined temperature range or temperature point, a responsive temperature range or temperature point, or a combination thereof. As an example, temperature can be controlled by a control algorithm executing via a process control computer.

In an aspect, the optical analysis system 100 can comprise an analyzer 138 configured to process a sample withdrawn from the interior fluid chamber 104. The sample can comprise a process sample, and/or a diluent, and/or a quencher. For example, at least a portion of contents of the first storage vessel 128 can be processed to provide one or more of spectral, chemical, and mechanical characteristics of the portion of contents. As another example, the analyzer 138 can be an offline analyzer, wherein results produced by the analyzer 138 can be compared and/or correlated using a multivariate model to the online results (e.g., NIR spectra results) of the optical cell 102.

In another aspect, the analysis system 100 (e.g., via the analyzer 138 and/or processing logic) can be configured to generate a standard model and/or calibration model based upon the calibrations and sample use of the analysis system 100. As an example, a standard curve/calibration curve can be generated for an analyte. As another example, a plurality of curves can be used to generate a model for a material comprising a plurality of analytes. As a further example, curves generated offline can be leveraged to generate a model using various software methods, mathematical methods, and statistical methods such as least square model fitting and the like. Such models can be referenced with monitoring or controlling operations in various process environments. For example, various industrial plants (e.g., cumene/phenol plant) can monitor and control (e.g., via controller 140) certain operations in the plants based at least in part on the generated models. As such, the analysis system 100 can be used to establish a baseline for particular operations against which subsequent processes may be compared.

Various fluids (e.g., gaseous, aqueous, etc.) can be caused to flow through the interior fluid chamber 104 for optical testing. In an aspect, one or more of the process inlet 108 and the process outlet 110 can be in fluid communication with an oxidation element, a concentrator, a reactor in a chemical processing plant, a vessel in a chemical processing plant, a vessel in a food processing plant, a medical sample vessel, or a combination thereof.

In another aspect, one or more of the process inlet 108 and the process outlet 110 can be in fluid communication with a cumene oxidation unit, CHP concentration unit, CHP decomposition unit, phenol purification unit, acetone purification unit, AMS recovery stage, purification stage, hydrogenation unit, p-cumyl phenol production stage, or p-cumyl purification unit, or a combination thereof.

In a further aspect, the controller 140 (e.g., programmable logic controller) can be configured to monitor and/or control one or more portions of a process environment. For example, the analyzer 138 can communicate information such as standard/calibration curves/models, calibration information, online measurement data, etc. to the controller 140 (e.g., remotely, via a feedback loop, etc.) to be used in making control decisions. As another example, the controller 140 can be configured to monitor and/or control a portion of a system (e.g., via feedback loop) in communication with the optical analysis system 100. As a further example, the controller 140 can be configured to monitor and/or control an oxidation element, a concentrator, a reactor in a chemical processing plant, a vessel in a chemical processing plant, a vessel in a food processing plant, a medical sample vessel, or a combination thereof. Other processing components and portions of plant operations can be monitored and/or controlled by controller 140 based at least in part on information received via a feedback loop from the analysis system 100.

As an example, one or more of the process inlet 108 and the process outlet 110 can be can be configured to receive a material from a system comprising: (i) an oxidation reactor configured to receive a cumene feed and an oxidizing agent and to output a cumene oxidation product comprising cumene hydroperoxide and dimethyl benzyl alcohol; (ii) a conversion reactor configured to receive the cumene oxidation product and to convert at least a portion of the dimethyl benzyl alcohol to cumene hydroperoxide by reacting the at least a portion of the dimethyl benzyl alcohol with hydrogen peroxide in both an organic phase and an aqueous phase to produce a converted cumene oxidation product; (iii) a cleavage reactor configured to receive one or more of the cumene oxidation product and the converted cumene oxidation product and to produce an output product comprising one or more of phenol, acetone, and alpha-methylstyrene; and (iv) a condensation reactor configured to receive the output product and to produce one or more of Bisphenol A and para-cumylphenol.

As an example, one or more of the process inlet 108 and the process outlet 110 can be can be configured to receive a material from a system comprising: an oxidation reactor configured to receive a cumene feed and an oxidizing agent and to output a cumene oxidation product comprising cumene hydroperoxide and dimethyl benzyl alcohol; and a conversion reactor configured to receive the cumene oxidation product and to convert at least a portion of the dimethyl benzyl alcohol to cumene hydroperoxide by reacting the at least a portion of the dimethyl benzyl alcohol with hydrogen peroxide in both an organic phase and an aqueous phase to produce a converted cumene oxidation product. However, other materials can be tested using the systems and methods described herein.

In an aspect, methods can comprise optically analyzing a fluid passing through an optical cell, such as optical cell 102. A temperature of the fluid can be determined during the optical analysis. A first sample of the fluid from the optical cell can be removed from the optical cell via a first bi-directional pump. A second sample can be mixed with the first sample. For example, the second sample can comprise a diluent, a quencher, or a combination thereof. As a further example, a second bi-directional pump can be configured to withdraw an amount of the second sample to mix with the first sample. In certain embodiments, the mixed first sample and second sample can be received in a vessel. The contents of the vessel can be can be processed to provide one or more of spectral, chemical, and mechanical characteristics of the contents.

The disclosed compositions and methods include at least the following aspects.

Aspect 1: A optical analysis system comprising: an optical cell having an interior fluid chamber defined by an interior surface of a housing; a process inlet disposed in the housing and in fluid communication with the interior fluid chamber; a process outlet disposed in the housing and in fluid communication with the interior fluid chamber, wherein the process inlet and process outlet facilitate the flow of a fluid through the interior fluid chamber; an optical element configured to direct electromagnetic radiation through a portion of the fluid flowing through the interior fluid chamber; a sampling outlet disposed in the housing and in fluid communication with the interior fluid chamber; and a first bi-directional pump in fluid communication with the sampling outlet and a first storage vessel, wherein the first bi-directional pump is configured to withdraw a first sample of the fluid flowing through the interior fluid chamber via the sampling outlet and to cause the first sample to flow into the first storage vessel.

Aspect 2: The optical analysis system of aspect 1, further comprising a second bi-directional pump in fluid communication with the first bi-directional pump and a second storage vessel, wherein the second bi-directional pump is configured to withdraw a second sample from the second storage vessel and to cause the second sample to mix with the first sample withdrawn from the interior fluid chamber.

Aspect 3: The optical analysis system of aspect 2, wherein the second sample comprises a quencher, a diluent, or a combination thereof.

Aspect 4: The optical analysis system of any of aspects 2-3, wherein one or more of the first bi-directional pump and the second bi-directional pump is a volumetric pump.

Aspect 5: The optical analysis system of any of aspects 2-4, wherein one or more of the first bi-directional pump and the second bi-directional pump comprises a syringe pump.

Aspect 6: The optical analysis system of any of aspects 2-5, further comprising a valve in fluid communication with the first bi-directional pump to control the ingress and egress of fluid relative to the first bi-directional pump.

Aspect 7: The optical analysis system of any of aspects 1-6, further comprising a temperature sensor configured to measure a temperature within the interior fluid chamber.

Aspect 8: The optical analysis system of any of aspects 1-7, further comprising a temperature controller configured to control a temperature of the optical cell.

Aspect 9: The optical analysis system of aspect 8, wherein the temperature of the optical cell is controlled to a predetermined temperature range or temperature point, a responsive temperature range or temperature point, or a combination thereof.

Aspect 10: The optical analysis system of any of aspects 1-9, wherein the optical element comprises fiber optics, one or more collimators, or a combination thereof.

Aspect 11: The optical analysis system of any of aspects 1-10, wherein the electromagnetic radiation directed through a portion of the fluid flowing through the interior fluid chamber has an optical path length between about 0.1 mm and about 20 mm.

Aspect 12: The optical analysis system of any of aspects 1-10, wherein the electromagnetic radiation directed through a portion of the fluid flowing through the interior fluid chamber has an optical path length between about 0.5 mm and about 100 mm.

Aspect 13: The optical analysis system of any of aspects 1-12, further comprising a mixing element disposed between the second bi-directional pump and the first bi-directional pump and configured to receive the first sample and the second sample and to mix the first sample with the second sample.

Aspect 14: The optical analysis system of any of aspects 1-13, wherein one or more of the process inlet and the process outlet is in fluid communication with an oxidation element, a concentrator, a reactor in a chemical processing plant, a vessel in a chemical processing plant, a vessel in a food processing plant, a medical sample vessel, or a combination thereof.

Aspect 15: The optical analysis system of any of aspects 1-14, wherein one or more of the process inlet and the process outlet is in fluid communication with a cumene oxidation unit, CHP concentration unit, CHP decomposition unit, phenol purification unit, acetone purification unit, AMS recovery stage, purification stage, hydrogenation unit, p-cumyl phenol production stage, or p-cumyl purification unit, or a combination thereof.

Aspect 16: The optical analysis system of any of aspects 1-15, further comprising an analyzer configured to process at least a portion of contents of the first storage vessel to provide one or more of spectral, chemical, and mechanical characteristics of the portion of contents.

Aspect 17: The optical analysis system of aspect 16, wherein the analyzer is configured to generate one or more of a standard model and a calibration model.

Aspect 18: The optical analysis system of any of aspects 1-17, further comprising a controller in communication with the analyzer to receive information therefrom, wherein the controller is configured to control an operation based at least in part on the information received from the analyzer.

Aspect 19: A sampling system for an optical cell containing a process fluid, the sampling system comprising: a first bi-directional pump in fluid communication with a sampling path wherein the first bi-directional pump is configured to withdraw a first sample of the process fluid and to cause the first sample to flow towards the first bi-directional pump, and a second bi-directional pump in fluid communication with the first bi-directional pump and a storage vessel, wherein the second bi-directional pump is configured to withdraw a second sample from the storage vessel and to cause the second sample to move toward and mix with the first sample, wherein a first rate of withdrawal of the first sample is greater than a second rate of movement of the second sample toward the first sample, and wherein a difference between the first rate and the second rate correspond to a pre-determined ratio of the first sample mixed with the second sample.

Aspect 20: The sampling system of aspect 19, wherein the second sample comprises a quencher, a diluent, or a combination thereof.

Aspect 21: The sampling system of any of aspects 19-20, wherein one or more of the first bi-directional pump and the second bi-directional pump is a volumetric pump.

Aspect 22: The sampling system of any of aspects 19-21, wherein one or more of the first bi-directional pump and the second bi-directional pump comprises a syringe pump.

Aspect 23: The sampling system of any of aspects 19-22, further comprising a valve in fluid communication with the first bi-directional pump to control the ingress and egress of fluid relative to the first bi-directional pump.

Aspect 24: The sampling system of any of aspects 19-24, further comprising a mixing element disposed between the second bi-directional pump and the first bi-directional pump and configured to receive the first sample and the second mix and to mix the first sample with the second sample.

Aspect 25: A method comprising: optically analyzing a fluid passing through an optical cell; determining a temperature of the fluid during the optical analysis; removing a first sample of the fluid from the optical cell via a first bi-directional pump; mixing a second sample with the first sample via a second bi-direction pump; and receiving the mixed first sample and second sample in a vessel.

Aspect 26: The method of aspect 25, wherein the second sample comprises a quencher, a diluent, or a combination thereof.

Aspect 27: The method of any of aspects 25-26, wherein one or more of the first bi-directional pump and the second bi-directional pump is a volumetric pump.

Aspect 28: The method of any of aspects 25-27, wherein one or more of the first bi-directional pump and the second bi-directional pump comprises a syringe pump.

Aspect 29: The method of any of aspects 25-28, further comprising analyzing at least a portion of mixed first sample and second sample to provide one or more of spectral, chemical, and mechanical characteristics of the mixed first sample and second sample.

Aspect 29: The method of aspect 29, further comprising controlling an operation based at least in part on information generated by the analyzing of the at least a portion of mixed first sample and second sample.

EXAMPLES

Detailed embodiments of the present disclosure are disclosed herein; it is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

Figure 2:
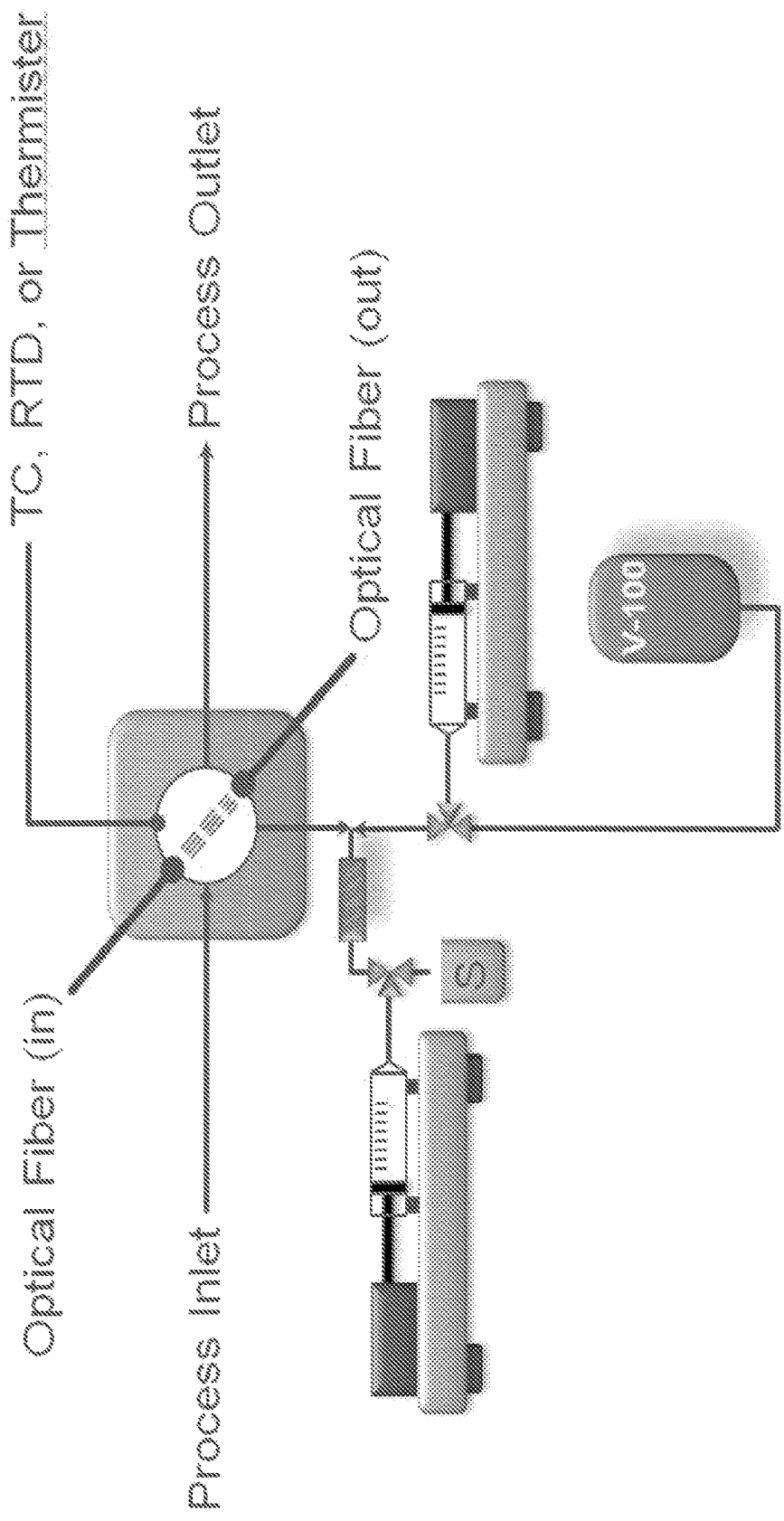
FIG. 2 shows an example optical analysis system according to another aspect of the present disclosure.

As shown in FIG. 2, an optical system (e.g., spectrometer) can comprise a process inlet and process outlet to convey the process fluid of interest through the optical cell and through the optical path of the optical system. The system can be designed such that the internal volume is minimized and that the optical path length may be varied from approximately 0.1 to 20 mm for liquid service and from 0.5 to 100 mm for process streams that are non-condensing vapor service. The internal surfaces of an interior chamber of the system can be formed from materials that provide mechanical stability of the components and minimize reactivity with the process stream. An incident electromagnetic radiation is supplied by a source and is by fiber optic coupled to the interior chamber equipped with appropriate beam collimators. As such, partially absorbed electromagnetic radiation is returned to an optical analyzer via a second collimator and fiber optic assembly. The obtained spectrum is stored and analyzed by software executed via a computing device. Spectra are obtained on demand or at set intervals.

A temperature measuring element is also integral with the optical system and can comprise a thermocouple (TC), thermistor, a Resistance Temperature Detector (RTD), a combination thereof, or other measuring device, and may be attached to some type of data recording system or have a local output.

In an aspect, sampling of the sample stream is carried out using two pumps. One of the pumps may be optionally connected to a reservoir (V100) of quencher or diluent as necessary for the particular analysis. This pump is equipped with a three-way valve to allow the charging of the syringe with the agent contained in V-100. Once the syringe is charged, the three-way valve is switched to allow flow in the direction of the optical cell. At this point the second syringe pump is initiated to withdraw the sample from the optical cell, while simultaneously pumping with the first syringe toward the interior chamber. Since both pumps are volumetric, the first pump must pump at a rate less than the rate of the second pump. The difference in rates will correspond to the amount of sample taken and the ratio of quencher/diluent to sample obtained. Once the sample is withdrawn into the second syringe pump (quenched or diluted as desired) it can be expelled into the sample container for off-line analysis (e.g., NMR, IR, UPLC, HPLC, GC, etc.). The first pump is then refilled from the reservoir in preparation of the next sample. Sample spectra, temperature, and off-line quenched/diluted sample can all be obtained simultaneously. Sample lines can be purposefully kept short to minimize any time delay. A static mixer may be optionally used to insure that quenching or dilution is uniform, repeatable, and reliable. In addition, the overall optical system may be optionally supplied with adaptive temperature control to minimize or eliminate the temperature differential between the cell and the rest of the process.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

This application claims the benefit of Russian Application Registration No. 2014147232 filed Nov. 24, 2014. The related application is incorporated herein by reference.

What is claimed is:

1. A system comprising:
an optical cell containing a process fluid;
a first bi-directional pump in fluid communication with a sampling path wherein the first bi-directional pump is configured to withdraw a first sample of the process fluid from the optical cell and to cause the first sample to flow towards the first bi-directional pump, and
a second bi-directional pump in fluid communication with the first bi-directional pump and a storage vessel, wherein the second bi-directional pump is configured to withdraw a second sample from the storage vessel and to cause the second sample to move toward and mix with the first sample, wherein a first rate of withdraw of the first sample is greater than a second rate of movement of the second sample toward the first sample, and wherein a difference between the first rate and the second rate correspond to a pre-determined ratio of the first sample mixed with the second sample.

2. The system of claim 1, wherein the second sample comprises a quencher, a diluent, or a combination thereof.

3. The system of claim 1, wherein one or more of the first bi-directional pump and the second bi-directional pump comprises a volumetric pump or a syringe pump, or both.

4. The system of claim 1, further comprising a mixing element disposed between the second bi-directional pump and the first bi-directional pump and configured to receive the first sample and the second mix and to mix the first sample with the second sample.

5. The system of claim 1 further comprising an analyzer configured to receive and analyze the first sample mixed with the second sample.

6. A method comprising providing the system of claim 1, providing the process fluid in the optical cell, withdrawing the first sample of the process fluid from the optical cell by the first bi-directional pump at the first rate, withdrawing the second sample from the storage vessel by the second bi-directional pump at the second rate, wherein the first rate is greater than the second rate and where the difference between the first rate and the second rate corresponds to a pre-determined ratio of the first sample mixed with the second sample.

* * * * *